(12) United States Patent
Kunori (10) Patent No.: US 10,319,061 B2
(45) Date of Patent: Jun. 11, 2019

(54) INFORMATION PROCESSING APPARATUS AND EVENT MANAGEMENT METHOD

(71) Applicant: CANON KABUSHIKI KAISHA, Tokyo (JP)

(72) Inventor: Shiro Kunori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 15/200,848

(22) Filed: Jul. 1, 2016

(65) Prior Publication Data
US 2017/0024065 A1    Jan. 26, 2017

(30) Foreign Application Priority Data

Jul. 22, 2015 (JP) ................................ 2015-145250

(51) Int. Cl.
G06F 3/0482    (2013.01)
G06F 3/0488    (2013.01)
G06T 1/20      (2006.01)

(52) U.S. Cl.
CPC .............. *G06T 1/20* (2013.01); *G06F 3/0482* (2013.01); *G06F 3/0488* (2013.01)

(58) Field of Classification Search
None
See application file for complete search history.

(56) References Cited

U.S. PATENT DOCUMENTS

| 9,336,322 | B2 | 5/2016 | Kunori | |
|---|---|---|---|---|
| 2010/0146458 | A1* | 6/2010 | Wadekar | G06F 3/038 |
| | | | | 715/863 |
| 2012/0023451 | A1* | 1/2012 | Kuroyanagi | G06F 8/38 |
| | | | | 715/835 |
| 2014/0292684 | A1* | 10/2014 | Shiitani | G06F 3/04883 |
| | | | | 345/173 |
| 2015/0199100 | A1 | 7/2015 | Kunori | |
| 2016/0225117 | A1* | 8/2016 | Sarna | G06T 15/005 |

FOREIGN PATENT DOCUMENTS

| JP | 05-158616 A | 6/1993 |
|---|---|---|
| JP | 2011-041010 A | 2/2011 |
| JP | 2014-060813 A | 4/2014 |
| JP | 2014-197315 A | 10/2014 |

OTHER PUBLICATIONS

Japanese Office Action issued in corresponding Japanese Application No. 2015145250 dated Apr. 8, 2019.

* cited by examiner

*Primary Examiner* — Stephen T. Reed
(74) *Attorney, Agent, or Firm* — Venable LLP (57) ABSTRACT

The present invention provides an information processing apparatus that includes: a change unit configured to change an event generated in response to an operation of an input device, based on the type of the event and the type of a graphics controller unit to which the event is to be transmitted, the graphics controller unit being configured to input a processing request that corresponds to the received event to an application; and a transmission unit configured to transmit the event changed by the change unit to the graphics controller unit.

8 Claims, 9 Drawing Sheets

| TYPE OF CONTROL | ID | REGION | PARENT ID | CORRESPONDING ACTION |
|---|---|---|---|---|
| WINDOW | 1000 | (0,0)~(800,480) | | |
| BUTTON | 1001 | (200,200)~(300,300) | 1000 | DISPLAY WINDOW WITH ID 2000 |
| BUTTON | 1002 | (600,200)~(700,300) | 1000 | DISPLAY WINDOW WITH ID 3000 |
| WINDOW | 2000 | (0,0)~(800,480) | | |
| LIST | 2001 | (400,100)~(600,400) | 2000 | DISPLAY WINDOW WITH ID 1000 |
| WINDOW | 3000 | (0,0)~(800,480) | | |
| ...... | ...... | ...... | ...... | ...... |

FIG. 4B

| TYPE OF CONTROL | ID | REGION | PARENT ID | CORRESPONDING ACTION |
|---|---|---|---|---|
| WINDOW | 5000 | (0,0)~(800,480) | | |
| WINDOW | 5100 | (200,200)~(300,300) | 5000 | |
| BUTTON | 5101 | (200,200)~(300,300) | 5100 | DISPLAY WINDOW WITH ID 6000 |
| WINDOW | 5200 | (600,200)~(700,300) | 5000 | |
| BUTTON | 5201 | (600,200)~(700,300) | 5200 | DISPLAY WINDOW WITH ID 7000 |
| ...... | ...... | ...... | ...... | ...... |

FIG. 4C

| TYPE OF CONTROL | ID | REGION | PARENT ID | CORRESPONDING ACTION |
|---|---|---|---|---|
| WINDOW | 10000 | (0,0)~(800,480) | | |
| WINDOW | 11000 | (50,380)~(150,420) | 10000 | |
| BUTTON | 11001 | (50,380)~(150,420) | 11000 | DISPLAY WINDOW WITH ID 20000 |
| WINDOW | 12000 | (200,380)~(300,420) | 10000 | |
| BUTTON | 12001 | (200,380)~(300,420) | 12000 | DISPLAY WINDOW WITH ID 30000 |
| WINDOW | 13000 | (350,380)~(450,420) | 10000 | |
| BUTTON | 13001 | (350,380)~(450,420) | 13000 | DISPLAY WINDOW WITH ID 40000 |

INFORMATION PROCESSING APPARATUS AND EVENT MANAGEMENT METHOD

BACKGROUND OF THE INVENTION

Field of the Invention

The present invention relates to a technique for controlling an event that occurs when an operation unit of an information processing apparatus is operated.

Description of the Related Art

In an information processing apparatus provided with a touch panel, when a user touches an object (hereinafter, referred to also as "target" or "operation target") displayed on the touch panel, typically, the touched operation target is selected through software (a graphics controller) that is included in the information processing apparatus processing the touch event that is generated by a device driver of the touch panel. On the other hand, when a user uses a mouse to select an object, typically, the operation target is selected through a graphics controller processing both an enter event that is generated by a device driver of the mouse when the mouse is moved to the operation target and a touch event that is generated by the device driver of the mouse when the mouse is clicked. Thus, typically, when the touch panel is used, the graphics controller that runs only in response to a touch event is used, and when the mouse is used, the graphics controller that runs in response to an enter event and a touch event is used. Note that in recent years, a technique is known for correcting an event detected by a touch panel driver and changing the processing based on the type of the detected event in order to improve user operability (see Japanese Patent Laid-Open No. 2014-197315).

The required event may change due to updating a graphics controller by upgrading the version thereof or changing the graphics controller to another one. For example, the graphics controller that is used for the touch panel may be changed to the graphics controller that is used for the mouse. In this case, prior to changing the graphics controller, only a touch event is needed for selecting an object, but after the change, both an enter event and a touch event are needed. Note that it is often difficult to alter a graphics controller due to licensing or the like, and even if alteration is possible, it will often involve alteration and recompilation of an application that uses the graphics controller. Therefore, it is typically difficult to change only the event that is required by a graphics controller.

The information processing apparatus provided with a touch panel includes a plurality of running applications, and a plurality of graphics controllers that are different between implementation languages of the applications. Here, there may be a case where, when the graphics controller for one application is updated or changed to another one, the event required by the graphics controller changes in order to support a certain operation. For example, when, as described above, the graphics controller for a mouse or a new graphics controller is used in place of the graphics controller for the touch panel for an application, an event needed for a selection operation may change from a touch event to an enter event and a touch event. In this case, the plurality of graphics controllers that need different events in order to support one operation will run on one information processing apparatus. Because the event generated by a touch panel driver does not change, only the graphics controller that supports the event generated by this driver, for example, the original graphics controller can run. As a result, even when, for example, a user uses an operation unit to perform an operation such as selection of a button, a running application will stop running, and there may be a running application and a non-running application.

SUMMARY OF THE INVENTION

The present invention provides an information processing apparatus and an event management method in which even if an event that causes a graphics controller to run is changed, the change of the event does not change an operation and an action of an application that supports the operation.

According to one aspect of the present invention, there is provided an information processing apparatus comprising: a change unit configured to change an event generated in response to an operation of an input device, based on a type of the event and a type of a graphics controller unit to which the event is to be transmitted, the graphics controller unit being configured to input a processing request that corresponds to a received event to an application; and a transmission unit configured to transmit the event changed by the change unit to the graphics controller unit.

According to the present invention, even if an event that causes a graphics controller to run is changed, the change of the event does not change an operation and an action of an application that supports the operation. Furthermore, in an information processing apparatus including graphics controllers that run in response to different events, it is possible for a user to operate a touch panel without recreating an existing application. Accordingly, it is possible to maintain application compatibility (compatibility such that even if a graphics controller is changed, an application can run without change).

Further features of the present invention will become apparent from the following description of exemplary embodiments with reference to the attached drawings.

DESCRIPTION OF THE EMBODIMENTS

Hereinafter, embodiments for implementing the present invention will be described with reference to the drawings.

First Embodiment

The following first describes a controller unit of an image forming apparatus, which is an embodiment of an information processing apparatus.

Configuration of Controller Unit of Image Forming Apparatus

Figure 1:
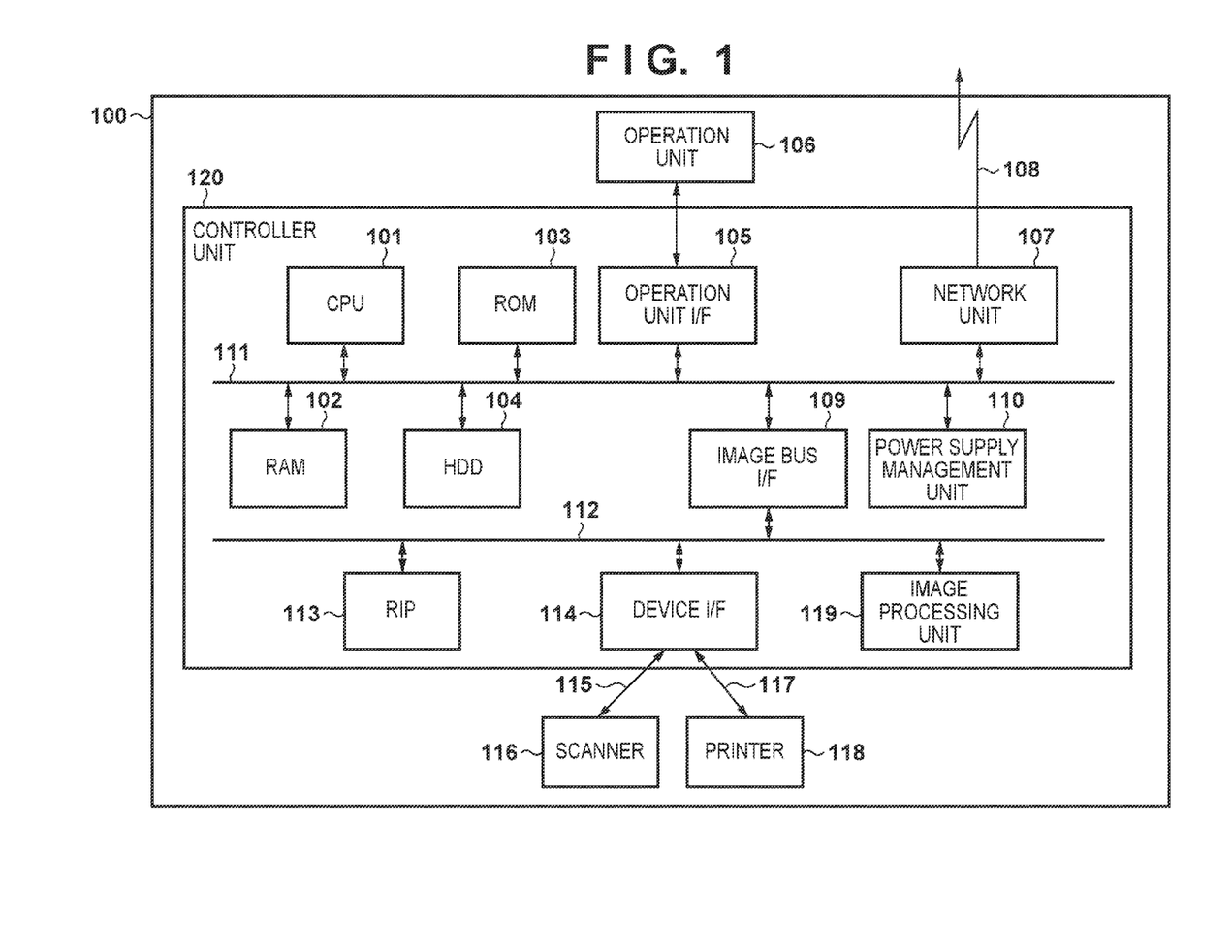
FIG. 1 is a block diagram illustrating a controller unit 120 of an image forming apparatus 100 according to embodiments of the present invention.

FIG. 1 is a block diagram illustrating an internal configuration of a controller unit of an image forming apparatus 100 according to the embodiments of the present invention. A controller unit 120 includes a CPU 101 for executing various types of control programs. The CPU 101 boots up a system based on a boot program stored in a ROM 103, reads the control programs stored in a hard disk device (HDD) 104 onto the system, and executes predetermined processing on the control programs using a RAM 102 as a work area. With the control programs, it is possible to execute predetermined control on a Java (registered trademark) program or the like. The HDD 104 stores the various types of control programs as well as image data and information relating to all communication means included in a network unit 107, which will be described later. The RAM 102, the ROM 103, and the HDD 104 are connected to the CPU 101 via a system bus 111. Furthermore, an operation unit I/F 105, the network unit 107, and an image bus I/F 109, and a power supply management unit 110 are connected to the CPU 101 via the system bus 111.

The operation unit I/F 105 is an interface unit to an operation unit (display) 106, and performs processing for acquiring image data to be displayed on the operation unit 106 from the RAM 102 and transferring the acquired image data, processing for transferring a signal generated by the operation unit 106 to the CPU 101, and the like. The operation unit 106 performs display processing for displaying operation targets such as buttons that can be operated by a user, and input processing for detecting a signal (input signal) generated by a user operating the information displayed using the display processing. The operation unit 106 includes a touch panel, which is a coordinate input device as will be described later, and an LCD, which is a display device as will be described later.

The power supply management unit 110 manages power-on/off of the image forming apparatus 100. Note that when power-on is detected, as described above, the CPU 101 boots up the system based on the boot program stored in the ROM 103, and executes the control programs stored in the HDD 104 on this system.

The network unit 107 is connected to a LAN 108, and inputs and outputs information via the LAN 108. If a web server or an external device 400 is connected to the LAN line, it will be possible to acquire information from the server via the LAN 108. Furthermore, it is also possible to connect to the Internet via a proxy server or the like on the LAN line and acquire web content from the web server on the Internet.

The image bus I/F 109 is a bus bridge that connects the system bus 111 and an image bus 112, and converts a data structure. The image bus 112 is a PCI bus through which image data can be transferred at a high speed, or a bus complying with the IEEE 1394 standard. A raster image processor (RIP) 113, a device I/F 114, and an image processing unit 119 are connected to the image bus 112. The RIP 113 expands a PDL code into a bitmap image. The device I/F 114 connects a scanner 116 and a printer 118, which are respectively an image input device and an image output device, to the controller unit 120, and converts the image data between synchronous and asynchronous systems. Here, the device I/F 114 and the scanner 116 are connected to each other via a cable 115, and the device I/F 114 and the printer 118 are connected to each other via a cable 117. The image processing unit 119 performs compression and decompression processing such as JPEG on multivalued image data, and performs compression and decompression processing such as JBIG, MMR, or MH on binary image data. Furthermore, the image processing unit 119 subjects input and output image data and an output screen to correction, processing, and editing, such as printer correction or resolution conversion.

As described above, the CPU 101 of the controller unit 120 performs overall control of access to the various devices connected to the system bus 110 based on the control programs, and reads image information from the scanner 116 via the device I/F 114. Furthermore, the CPU 101 subjects the read image information to predetermined processing, and then performs control so that the image information is output to the printer 118 via the device I/F 114, for example. Furthermore, the CPU 101 performs analysis/conversion processing on text data and image data that were acquired via the network unit 107, and stores the processed data in the HDD 104 or performs control of display of the operation unit 106.

Control of Operation Unit 106 by CPU 101

Figure 2:
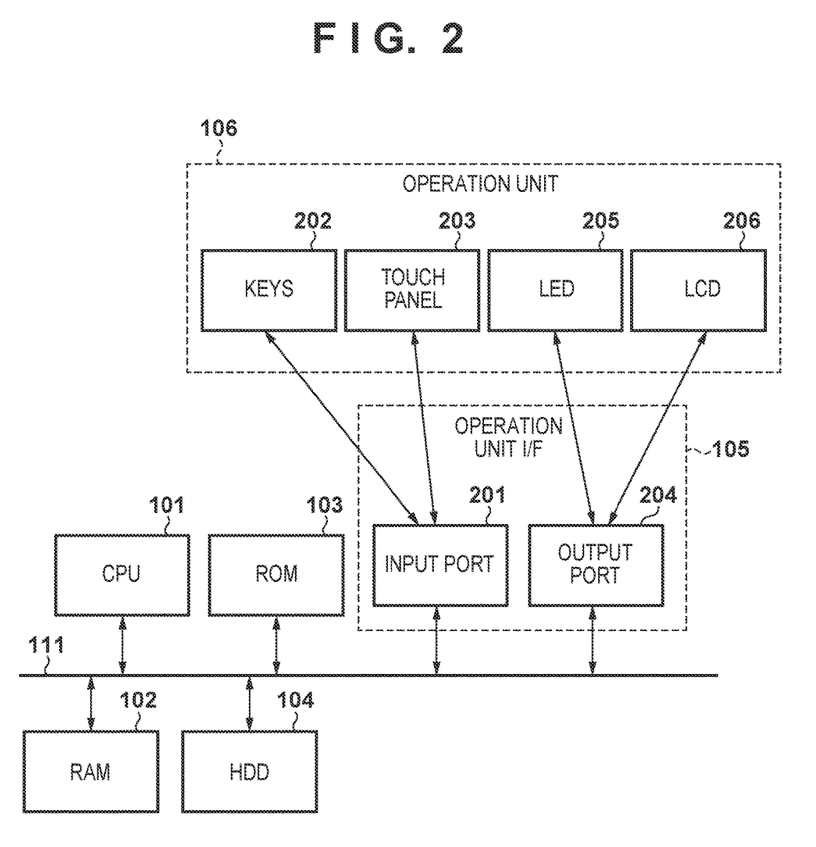
FIG. 2 is a block diagram illustrating a configuration of an operation unit 106 of the image forming apparatus 100 and the periphery thereof, according to the embodiments of the present invention.

FIG. 2 is a block diagram illustrating a configuration of the operation unit 106 of FIG. 1 and the periphery thereof. A touch panel 203 and a key of hard keys 202 of the operation unit 106 are connected to the CPU 101 via an input port 201 of the operation unit I/F 105. Furthermore, positional information indicating a position on the touch panel 203 at which a user has pressed and key information corresponding to the pressed key of the keys 202 are input to the CPU 101 via the input port 201.

An LED 205 and an LCD 206 of the operation unit 106 are connected to the CPU 101 via an output port 204 of the operation unit I/F 105, and lighting of the LED 205 and display of the LCD 206 are controlled by the CPU 101. A small amount of electricity flows through the touch panel 203, and the touch panel 203 is an electrostatic type touch panel that detects a touched position based on a change in the amount of electricity that is caused by a user touching the panel, and is arranged on the LCD 206 so as to overlap it. When the user directly touches an operation target such as a virtual button (hereinafter, referred to as "button") displayed on the LCD 206, the touch panel 203 detects the positional information (coordinates) thereof. After detecting the positional information, the CPU 101 determines what the operation target selected by the user is, based on the operation target currently displayed on the LCD 206 and its coordinates. Then, the CPU 101 detects, from among commands stored in advance in the ROM 103 or the HDD 104, the command that is to be executed when the detected operation target is selected, and executes this command. Accordingly, screen data to be displayed on the LCD 206 is generated. By the CPU 101 transmitting this screen data to the LCD 206 via the output port 204, the display of the operation unit 106 can be changed. Note that such internal processing performed at the time of a user operation on the LCD 206 is common to all of the following descriptions, and a description thereof is omitted hereafter. Note that the touch panel is not limited to the above-described electrostatic type touch panel, and may be a touch panel of another type such as a resistive type or a surface acoustic wave type.

Software Configuration

Figure 3:
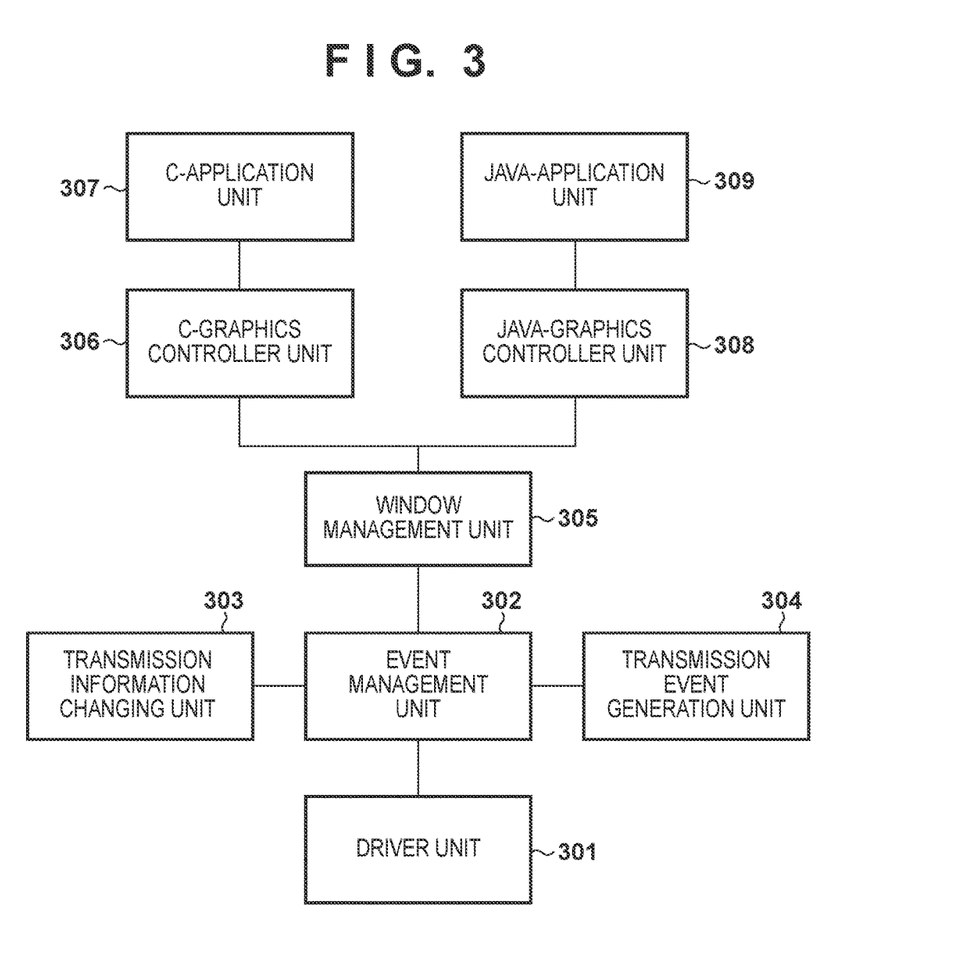
FIG. 3 is a diagram illustrating a configuration of software modules according to the embodiments of the present invention.

The following describes a configuration of software modules running on hardware such as the CPU 101 and the HDD 104 of the image forming apparatus 100, with reference to FIG. 3, which illustrates a configuration of the modules. Note that processes in the modules are realized by the programs stored in the ROM 103 and the HDD 104 being read and predetermined processing being executed using the RAM 102 as a work area, in accordance with an instruction of the CPU 101. Furthermore, all pieces of information that are generated by the execution of the predetermined processing are stored in the RAM 102 or the HDD 104. Such processes in the modules are the same unless otherwise noted, and thus a description of such hardware is omitted hereafter. Furthermore, the detailed processes of the modules of FIG. 3, which illustrates a configuration of the modules, will also be described later with reference to the flowchart of FIG. 7.

A driver unit 301 is a touch panel driver, which is a module for detecting an operation event such as a touch event or a release event that occurs when a user has performed an operation, for example, the user has touched the operation unit 106 (to be exact, the LCD 206 of the operation unit 106). The operation event includes the type of the event and coordinates of the event. This driver unit 301 transmits the detected operation event to an event management unit 302.

The event management unit 302 is a module for receiving the event (referred to also as "event information") transmitted from the driver unit 301, changing the received event or generating a new event according to the application displayed on the operation unit 106, and transmitting the corresponding event to a window management unit 305, which will be described later. The event management unit 302 uses the window management unit 305, which will be described later, in order to specify the application program (hereinafter, abbreviated as "application") that is performing display, and uses a transmission information changing unit 303 or a transmission event generation unit 304, which will be described later, in order to perform the event change or generation.

The transmission information changing unit 303 is a module for receiving a transmission information change request from the event management unit 302, changing transmission information, and transmitting the changed information to the event management unit 302.

The transmission event generation unit 304 is a module for receiving a transmission event generation request from the event management unit 302, generating a dummy event based on the received information, and transmitting the generated dummy event to the event management unit 302.

The window management unit 305 is a module for receiving the event or the changed information from the event management unit 302, and transmitting the event to a graphics controller unit that corresponds to the application that is performing display on the operation unit 106. Furthermore, the window management unit 305 also manages a window to be displayed on the operation unit 106, and is capable of specifying the type of the application of which the window is being displayed on the operation unit 106 and displaying a suitable window on the operation unit 106.

A C-graphics controller unit 306 is a module constituted by rendered controls such as a button, a list, and a window for use by applications implemented in the C language of a C-application unit 307, which will be described later. Note that the rendered controls of the C-graphics controller unit 306 are all arranged on windows, and a plurality of rendered controls can be arranged on one window. Accordingly, the screen of the operation unit 106 is switched by switching the window. Note that information relating to coordinates at which the rendered controls are arranged and to execution processing that corresponds to the rendered controls is included in the program of the application. Furthermore, the C-graphics controller unit 306 serves also as a module for transmitting, upon receiving the event from the window management unit 305, an execution processing request to the application of the window displayed on the operation unit 106. Furthermore, in the description above, "rendered control" is used as a term indicating an object to be displayed, but the object to be displayed may also be referred to as "widget" or "control."

The C-application unit 307 is a set of applications implemented in the C language (hereinafter, referred to as "C-applications"). After receiving the execution processing request from the C-graphics controller unit 306, the application of this C-application unit 307 executes the processing that corresponds to the execution processing request. For example, if processing A of the application is desired to be executed, a button A for executing the processing A is arranged on a window, and this window is displayed on the operation unit 106. When a user presses this button A, the C-graphics controller unit 306 detects the selection of the button A, and transmits, to the application, an event for requesting execution of the processing A that is associated with this button A. The application executes the processing corresponding to the received event.

A Java-graphics controller unit 308 is a module constituted by rendered controls such as a button and a list for use by applications implemented in the Java language of a Java-application unit 309, which will be described later. Similar to the foregoing C-graphics controller unit 306, the Java-graphics controller unit 308 transmits, upon receiving the event from the window management unit 305, an execution processing request to the application of the window displayed on the operation unit 106.

The Java-application unit 309 is a set of applications implemented in the Java language (hereinafter, referred to as "Java applications"). After receiving the event from the Java-graphics controller unit 308, the application of this Java-application unit 309 executes the processing that corresponds to this event. Hereinafter, the processing performed by the C-graphics controller unit 306 and the Java-graphics controller unit 308 are described in detail.

Description of C-Graphics Controller Unit

Figure 4A:
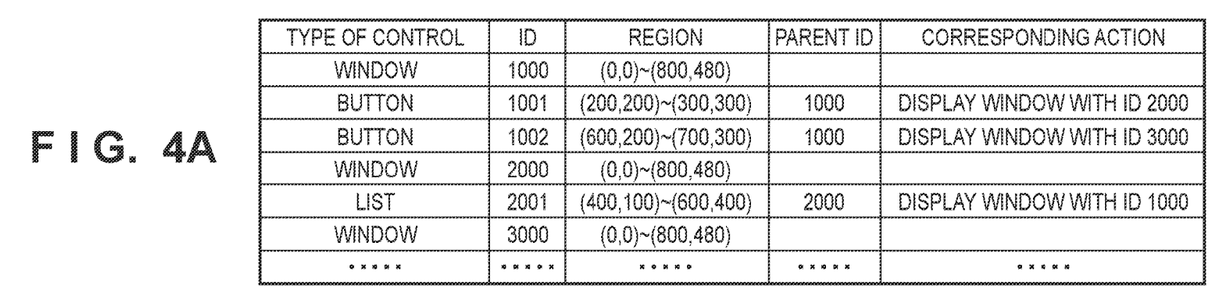
FIGS. 4A, 4B, and 4C are diagrams illustrating rendered controller management tables stored in an HDD 104 of the image forming apparatus 100.
Figure 4B:
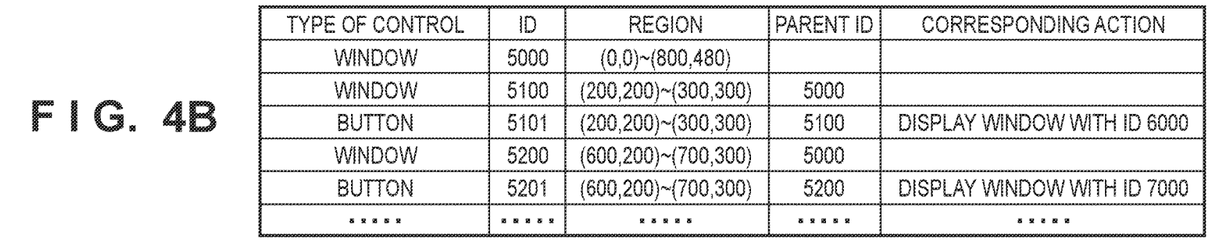
Figure 4C:
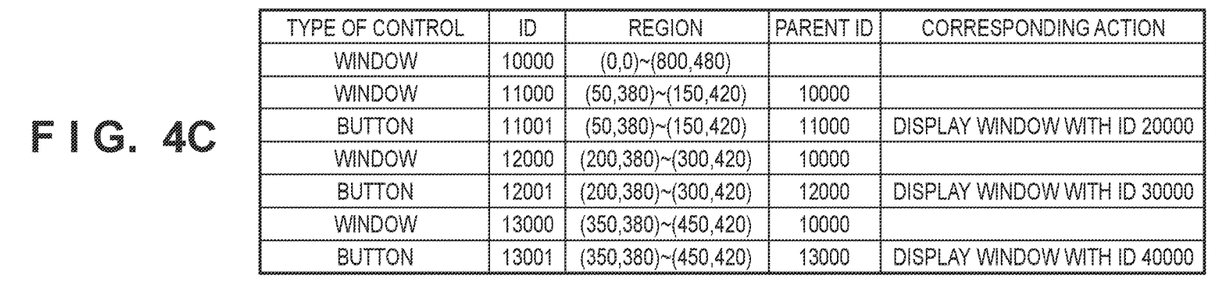

The C-graphics controller unit 306 is first described. The pieces of information regarding the rendered controls for use by the applications of the C-application unit 307 are stored in advance in association with the respective applications in a table format in the HDD 104, and here FIGS. 4A, 4B, and 4C show the information regarding the rendered controls for use by an application (application X). Note that in the following, it is assumed that information regarding the rendered controls expressed in tables as shown in FIGS. 4A, 4B, and 4C is referred to as "rendered control management table". Hereinafter, FIGS. 4A, 4B, and 4C will be described.

"Type of Control" refers to information indicating the types of rendered controls, and includes window, button, list, and the like. "ID" refers to identification information such as the number for uniquely identifying each control. "Region" refers to a position at which each control is arranged, and is here specified by upper left coordinates and lower right coordinates. "Parent ID" refers to an ID of the window serving as a base on which each control is to be arranged. "Corresponding action" refers to an action that is performed when the corresponding control is selected. Note that in the following description, an ID is given to a type of a control so as to specify the control.

Figure 5:
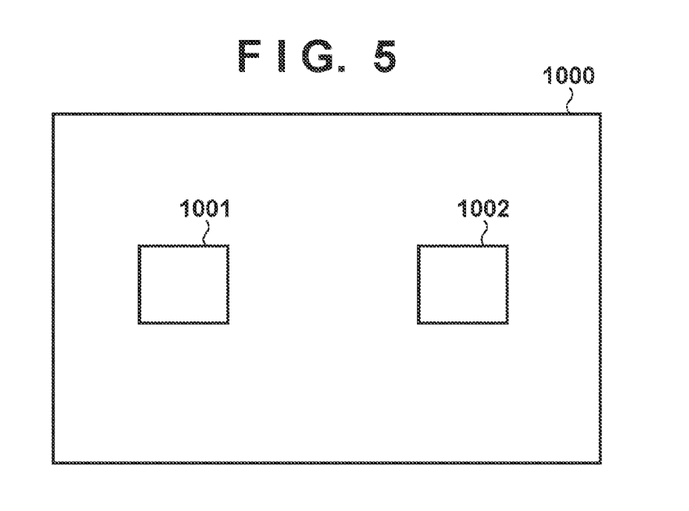
FIG. 5 illustrates an example of a screen that is displayed on the operation unit 106 of the image forming apparatus 100.

FIG. 4A shows that the application X includes a window with the ID 1000 (hereinafter, referred to as "window 1000" and the same applies to other controls), and a window 2000. Furthermore, FIG. 4A shows that a button 1001 and a button 1002 are arranged on the window 1000, and a list 2001 is arranged on the window 2000. In this example, when the window 1000 is displayed on the operation unit 106, the screen of FIG. 5 is obtained, and if a user selects the button 1001 on this screen, a screen of window 2000 will be displayed.

Hereinafter, internal processing for selecting a button will be described. A description here is given assuming that the controls such as the windows are objects that can serve as subjects of processing. However, processing that is performed by an object corresponding to a window or a widget may be executed by, for example, the graphics controller unit 306 or 308 or the window management unit 305. Anyway, the processing is executed by the CPU 101 in the hardware configuration. In order to select a button of the C-graphics controller unit 306, both a touch event and a release event at coordinates in the region of the button need to successively be transmitted to the window that is displaying this button. "Touch event" is an event indicating that the operation unit 106 has been touched by a finger, and "release event" is an event indicating that the finger has been released from the operation unit 106. Furthermore, in the following, an event that includes the event type and coordinates is referred to as "operation event". In order to select the button 1001 of FIG. 5, the C-graphics controller unit 306 needs to receive the operation events that have the event types "touch" and "release" with respect to the window 1000. Furthermore, the events that are received here also need to have the coordinates that are within the region of the button 1001, that is, the region of (200, 200) to (300, 300). Upon receiving these two operation events, the C-graphics controller unit 306 recognizes that the button 1001 has been selected. Then, the C-graphics controller unit 306 transmits a request to the application (application X) of the C-application unit 307 to display the window 2000, as a corresponding action of the button 1001.

Description of Java-Graphics Controller Unit

Hereinafter, the Java-graphics controller unit 308 is described. The Java-graphics controller unit 308 is a set of rendered controls available for the applications of the Java-application unit 309, and the rendered controls include buttons and windows. Note that the Java-graphics controller unit 308 is a window-based controller in which only one rendered control can be arranged on one window. Accordingly, when the screen of FIG. 5 is displayed on the operation unit 106, the rendered control management table of FIG. 4B is used. In FIG. 4B, a window 5100 and a window 5200 are arranged on a window 5000. Also, a button 5101 is arranged on the window 5100, and a button 5201 is arranged on the window 5200. Note that in the following, the window that does not have a parent ID is referred to as "base window" and the window that has a parent ID is referred to as "child window". Note that in the following, just "window" refers to a base window, unless otherwise noted.

The Java-graphics controller unit 308 also needs window-based events for selecting a button. The button of the Java-graphics controller unit 308 needs to successively transmit four events, namely, an enter event, a touch event, a release event, and a leave event, to the window that is displaying the button, in response to the selection operation. The enter event is an event indicating that the denoted position has entered a region in the window, and the leave event is an event indicating that the denoted position has exited from the region of the window. Accordingly, in order to select the button 5101, the Java-graphics controller unit 308 needs to successively receive four operation events with respect to the child window 5100, from the window management unit 305. The four operation events refer to events that have the event types "enter", "press", "release", and "leave". Furthermore, the coordinates of these events need to be indicated by a coordinate system within the transmitted window (a child window rather than a base window). For example, the button 5101 of FIG. 4B is expressed by the coordinates (200, 200) at the upper left corner and the coordinates (300, 300) at the lower right corner in the coordinate system of the display screen of the operation unit 106, but the coordinates of the events need to be expressed in the coordinate system of the child window, for example, the button 5101 needs to be expressed by the coordinates (0, 0), which is the origin at the upper left corner, and (100, 100).

The above is a description of the C-graphics controller unit 306 and the Java-graphics controller unit 308 of the present embodiment. As described above, the C-graphics controller unit 306 and the Java-graphics controller unit 308 need to receive different events for the same selection operation, for example.

Procedure from Event Detection to Event Transmission

Figure 7:
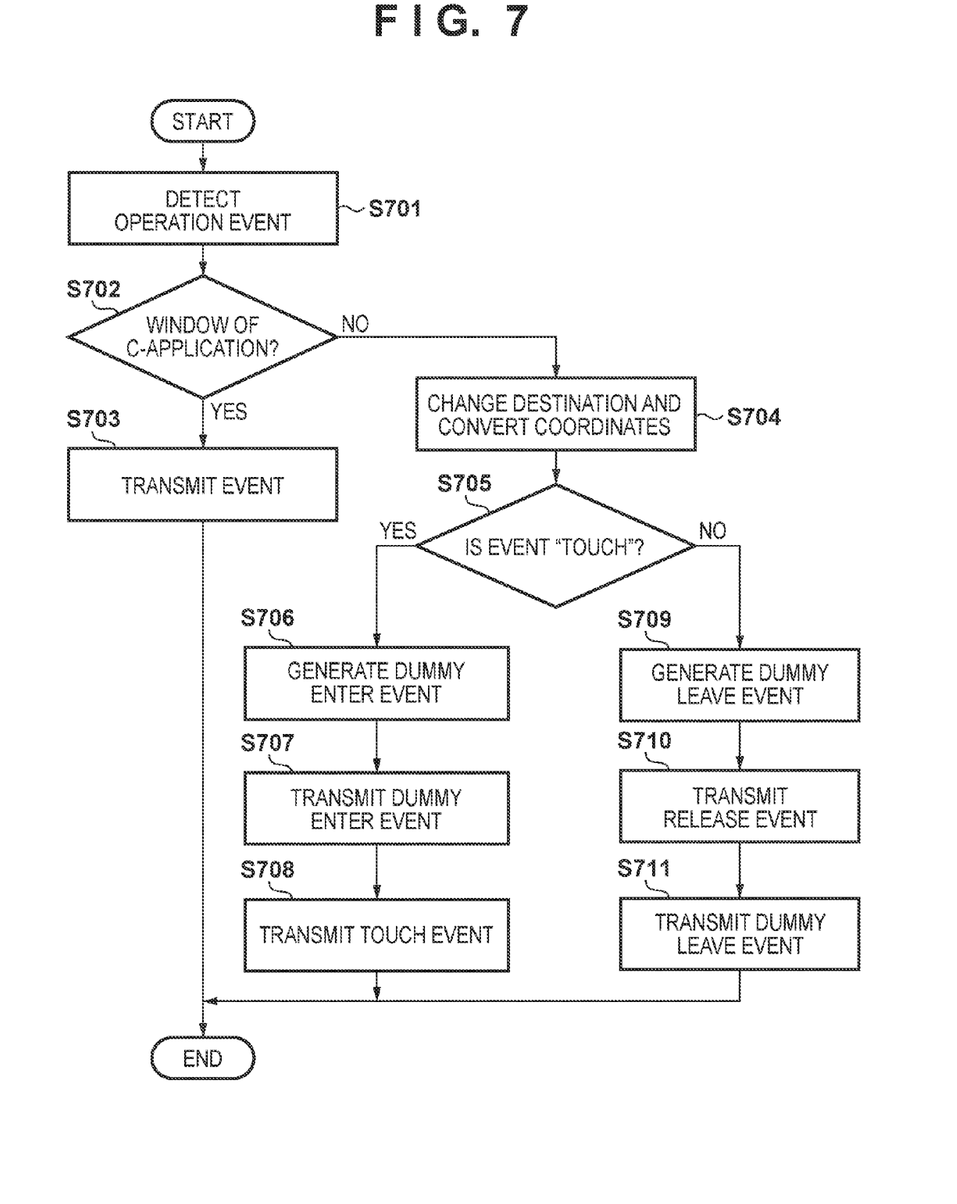
FIG. 7 is a flowchart of processing for controlling an event in accordance with a user operation according to the embodiments of the present invention.

The following describes processing from an event being detected by the driver unit 301 to the detected event being transmitted to the C-graphics controller unit 306 or the Java-graphics controller unit 308, with reference to the flowchart of FIG. 7. Note that descriptions of specific examples will follow the description of the processing with reference to the flowchart of FIG. 7. Here, the driver unit 301 generates an event that corresponds to the C-graphics controller unit 306. That is, by the event generated by the driver unit 301 being directly input to a window of the C-application unit 307, the C-application unit 307 can execute the processing that corresponds to the event.

When a user operates the operation unit 106, the driver unit 301 detects an operation event (step S701). This operation event includes the event type and coordinates at which the event occurred. Note that the method of detecting the operation event corresponds to the detection method of the type of the employed touch panel, for example, a general resistance film type (pressure-sensitive type) or electrostatic type operation panel, and thus a detailed description thereof will be omitted. The driver unit 301 transmits the detected operation event to the event management unit 302.

After having received this operation event, the event management unit 302 transmits a request to the window management unit 305 to determine whether or not the window displayed on the operation unit 106 is a window of the C-application. After having received the request, the window management unit 305 determines whether or not a window of the C-application is displayed based on information regarding the window displayed on the operation unit 106 (window information) (step S702). Then, the window management unit 305 transmits the determination result to the event management unit 302.

If it is determined that a window of the C-application is displayed based on the determination result received from the window management unit 305, the event management unit 302 transmits the operation event received from the driver unit 301 to the window management unit 305 (step S703). After having received the operation event, the window management unit 305 specifies the window of the application that is displayed on the operation unit 106, and specifies the graphics controller that includes this window. Here, since a window of the C-application is displayed on the operation unit 106, the window management unit 305 transmits, to the C-graphics controller unit 306, destination information (window ID) and the operation event received from the driver unit 301. This is the processing that is performed when a window of the C-application is displayed on the operation unit 106.

On the other hand, if the window displayed on the operation unit 106 is not a window of the C-application (the determination of step S702 is "NO"), the event management unit 302 performs destination change and coordinate change (step S704). The details thereof will be described.

First, the event management unit 302 transmits a transmission information change request and the operation event received from the driver unit 301 to the transmission information changing unit 303. After having received these, the transmission information changing unit 303 searches for, based on the coordinates of the received operation event, a child window that includes these coordinates in its region, and sets the ID of the found child window as destination information. Furthermore, the transmission information changing unit 303 changes the coordinates of the received operation event to coordinates within the child window. For example, by referencing the rendered control management tables shown in FIGS. 4A, 4B, and 4C, the transmission information changing unit 303 converts the coordinates of the child window that are expressed in the coordinate system of the operation unit 106 into the coordinates in the coordinate system of the child window with the origin of the child window set as (0, 0). For example, the event coordinates of the child window 5100 of FIG. 4B are converted into the coordinates obtained by subtracting 200 from the respective coordinates X and Y. Note that in the following, the event obtained by changing the coordinates of the received operation event in this way is referred to as "new operation event". After changing the coordinates, the transmission information changing unit 303 transmits the destination information (ID of the child window) and the new operation event to the event management unit 302. The above is a detailed description of the destination change and the coordinate change.

After having received the destination information and the new operation event from the transmission information changing unit 303, the event management unit 302 transmits a transmission event generation request and the new operation event to the transmission event generation unit 304. After having received these, the transmission event generation unit 304 determines whether the event type of the received new operation event is "touch" or "release" (step S705).

First, a case is described in which a result of this determination shows that the event type is "touch" (determination of step S705 is "YES"). The transmission event generation unit 304 generates a dummy event that corresponds to the event type of the received new operation event. Specifically, if the event type is "touch", the transmission event generation unit 304 generates a dummy event whose event type is "enter" (step S706). Note that the coordinates of the dummy event are set to (0, 0) regardless of the event type (regardless of whether the new operation event is an enter event or a leave event). Then, the transmission event generation unit 304 transmits the generated dummy event to the event management unit 302. After having received the dummy event, the event management unit 302 transmits the dummy event and the destination information received from the transmission information changing unit 303 to the window management unit 305 (step S707). Then, the event management unit 302 further transmits the destination information and the new operation event that were received from the transmission information changing unit 303 to the window management unit 305 (step S708). After having received these events, the window management unit 305 transmits the received events to the graphics controller unit that includes the destination information. As a result, when a touch event is generated by the driver unit 301, the Java-graphics controller unit 308 receives the touch event and the enter event added as a dummy from the window management unit 305, and the event coordinates of the touch event are expressed in the coordinate system of the target window of this event. The above is a description of the case where the event type of an operation event is "touch".

Next, a case is described in which the result of the determination by the transmission event generation unit 304 shows that the event type is "release" (determination of step S705 is "NO"). If it is determined that the type of the received operation event is "release", the transmission event generation unit 304 generates a leave event as a dummy (step S709). Then, the transmission event generation unit 304 transmits the generated dummy event to the event management unit 302. After having received the dummy event, the event management unit 302 transmits the destination information and the new operation event that were received from the transmission information changing unit 303 to the window management unit 305 (step S710). Then, the event management unit 302 further transmits the destination information received from the transmission information changing unit 303 and the dummy event received from the transmission event generation unit 304 to the window management unit 305 (step S711). After having received these events, the window management unit 305 transmits the received events to the graphics controller unit that includes the destination information. As a result, when a release event is generated by the driver unit 301, the Java-graphics controller unit 308 receives the release event and the leave event added as a dummy from the window management unit 305, and the event coordinates of the touch event are expressed in the coordinate system of the target window of this event. The above is a description in the case where the event type of an operation event is "release". The description of the flowchart of FIG. 7 ends.

Specific Examples

Figure 6:
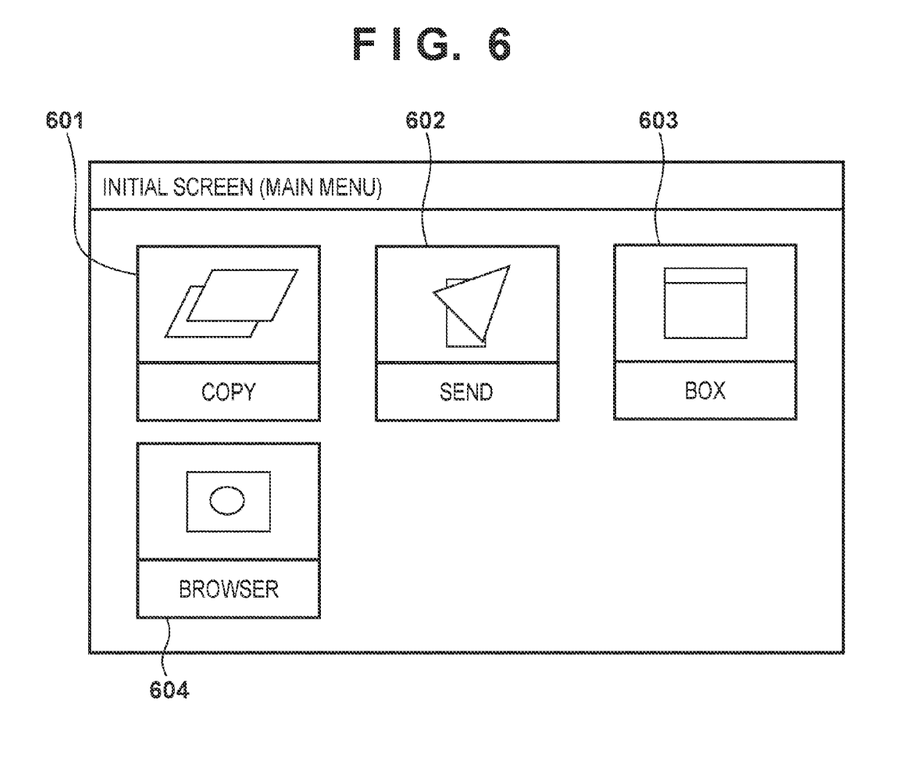
FIG. 6 illustrates an example of a screen that is displayed on the operation unit 106 of the image forming apparatus 100.

The following describes processing of the flowchart of FIG. 7 with reference to specific examples. FIG. 6 illustrates an example of a display of the operation unit 106 of the image forming apparatus 100 according to the embodiments of the present invention, the display showing a screen that is first displayed when the image forming apparatus 100 is turned on (powered on). Note that in the following, the screen that is first displayed on the operation unit 106 after the image forming apparatus 100 is powered on is referred to as "initial screen". This initial screen is a menu screen indicating applications executable by the image forming apparatus 100, and is displayed by a main menu application.

FIG. 6 shows buttons 601 to 604 for accessing respective applications. The copy button 601 is a button for accessing a copy application, and the send button 602 is a button for accessing a send application. Similarly, the box button 603 is a button for accessing a box application, and the browser button 604 is a button for accessing a browser application. It is assumed that the copy application, the send application, and the box application are Java applications, and the main menu application and the browser application are C-applications.

A specific example of when the browser button 604 has been touched on such an initial screen is first described. Then, a specific example when a button has been selected on a screen of the browser application, which is a C-application, and a specific example when a button has been selected on a screen of the copy application, which is a Java application, will be described.

Case where Browser Button 604 is Selected on Initial Screen

It is presumed that on the initial screen, a user has touched (pressed) the coordinates (100, 300) at which the browser button 604 is located. Note that the range of coordinates on the operation unit 106 of the present embodiment that can be pressed is a range that has opposing corners at (0, 0) and (800, 480), that is, a range that has the X coordinates 0 to 800 and the Y coordinates 0 to 480.

The driver unit 301 detects the operation event that has the event type "touch" and the coordinates (100, 300) (step S701). The driver unit 301 transmits the detected operation event to the event management unit 302. After having received this event, the event management unit 302 transmits a request to the window management unit 305 to determine whether or not the window displayed on the operation unit 106 is a window of the C-application.

After having received the request, the window management unit 305 determines whether or not the window displayed on the operation unit 106 is a window of the C-application (step S702). Here, since the window of the main menu application, which is a C-application, is displayed, the window management unit 305 transmits the determination result indicating that it is a window of the C-application to the event management unit 302.

After having received the determination result, the event management unit 302 transmits the operation event received from the driver unit 301 to the window management unit 305 (step S703). After having received the operation event, the window management unit 305 regards the window displayed on the operation unit 106 as destination information, and transmits the destination information and the received event to the C-graphics controller unit 306. It is presumed that the user has then released his or her finger from the position at the coordinates (100, 300).

The driver unit 301 detects the operation event that has the event type "release" and the coordinates (100, 300) (step S701). The processing thereafter until the operation event is transmitted to the C-graphics controller unit 306 is the same as that in the above-described case of the touch event. The driver unit 301 transmits the received operation event to the event management unit 302.

Then, the event management unit 302 uses the window management unit 305 to determine whether or not the window displayed on the operation unit 106 is a window of the C-application (step S702). Then, the event management unit 302 transmits the event received from the driver unit 301 to the window management unit 305 (step S703).

After having received the event, the window management unit 305 transmits the received event to the C-graphics controller unit 306. Based on the above-described touch event and the currently received release event, the C-graphics controller unit 306 determines that the browser button 604 has been selected. Here, it is assumed that the browser button 604 has stored processing for booting up the browser application as a corresponding action. Accordingly, the C-graphics controller unit 306 transmits a boot-up processing request to the browser application, which is one of the C-application units 307. Upon receiving the boot-up processing request, the browser application displays the screen of the browser application of FIG. 9 on the operation unit 106. The above is a description of the specific example of when the browser button 604 has been selected on the initial screen. Hereinafter, the screen of FIG. 9 will be described.

Operation on Browser Screen

Figure 9:
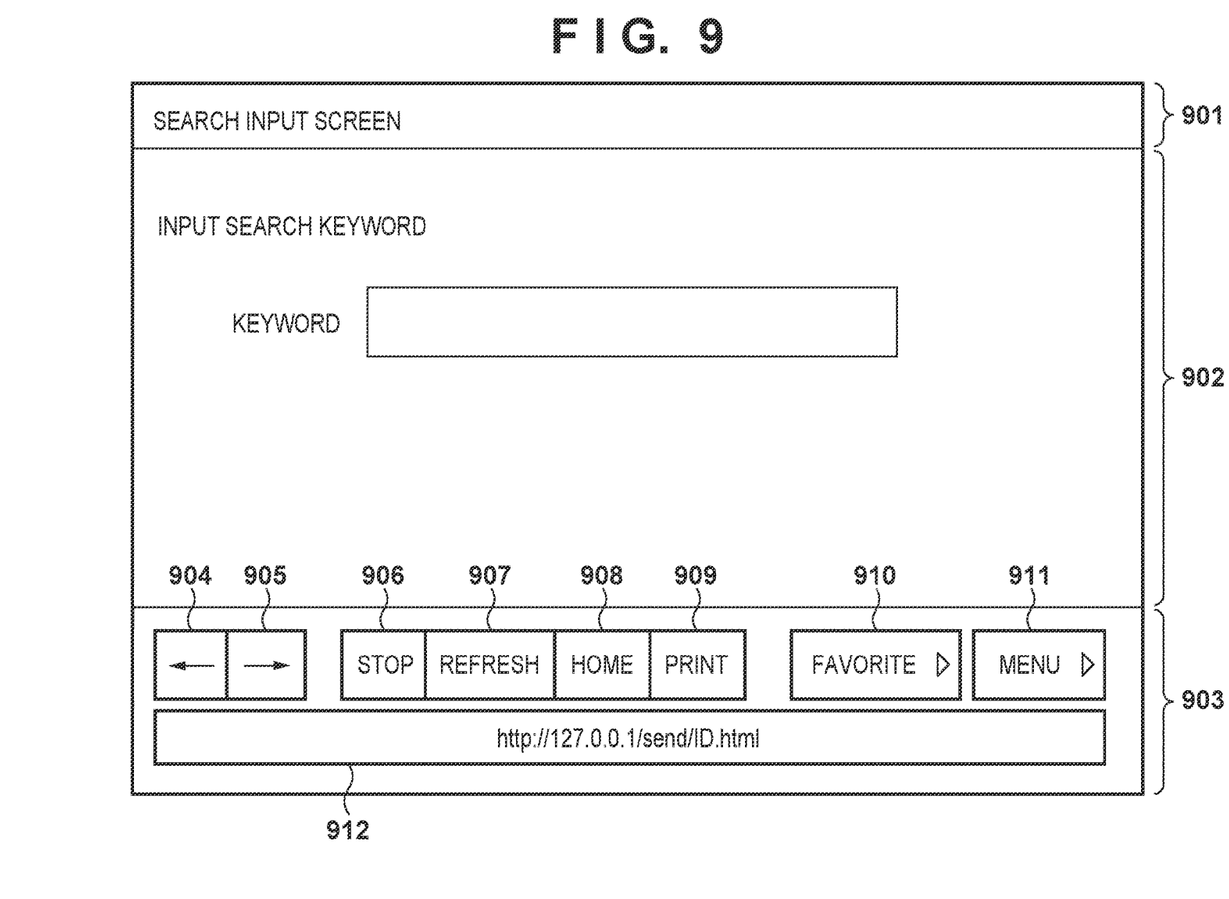
FIG. 9 illustrates an example of a screen that is displayed on the operation unit 106 of the image forming apparatus 100.

The web browser screen of FIG. 9 is constituted by a title display region 901, a web content display region 902, and a setting item display region 903. The title display region 901 is a region for displaying a title character string indicating web content that is to be displayed in the web content display region 902. Here, the character string "search input screen" is designated and displayed. The web content display region 902 is a region for displaying, as a web page, the web content corresponding to a designated URL address. The setting item display region 903 is a region for displaying web browser-related setting items, in which buttons 904 to 912 that indicate the setting items are displayed. The following describes these buttons. The button 904 is a back button for the display of the web content, and the button 905 is a forward button for the display of the web content. The button 906 is a button to stop reading the web content, and the button 907 is a button to re-read the web content. The button 908 is a home button, which is a button to display the web content of a predetermined home address. The button 909 is a print button, which is a button to display a print instruction screen for printing of the web content currently displayed in the web content display region 902, the print instruction screen being displayed when the print button is pressed. The button 910 is a favorite button, which is a button for a user to select a desired URL address. The button 911 is a menu button, which is a button to configure various settings relating to the web browser (settings relating to display, printing, and operation). The button 912 is a URL address display button, and here is displaying the URL address "http://127.0.0.1/send/ID.html". The above is a description of the screen of FIG. 9.

When Button is Touched on Browser Screen

It is presumed that a user has touched the position of the coordinates (400, 400) on the screen of FIG. 9. The driver unit 301 detects the operation event that has the event type "touch" and the coordinates (400, 400) (step S701). The driver unit 301 transmits the detected information to the event management unit 302. The event management unit 302 uses the window management unit 305 to determine whether or not the window of the application displayed on the operation unit 106 is a window of the C-application, and here the browser application, which is a C-application, is displayed on the operation unit. Therefore, the processing thereafter is the same as the above-described processing that is performed when the coordinates (100, 300) has been touched on the initial screen. That is, the event management unit 302 transmits the operation event to the window management unit 305, and the window management unit 305 transmits the event to the C-graphics controller unit 306. Furthermore, the processing thereafter that is performed when the user releases his or her finger from the position of the coordinates (400, 400) is also the same as the above-described processing that is performed when the coordinates (100, 300) has been touched on the initial screen. Here, the driver unit 301 detects the operation event that has the event type "release" and the coordinates (400, 400). Then, the driver unit 301 transmits this operation event to the event management unit 302, the event management unit 302 transmits the operation event to the window management unit 305, and the window management unit 305 transmits the event to the C-graphics controller unit 306.

Based on the above-described touch event and the currently received release event, the C-graphics controller unit 306 determines that the print button 909 has been selected. Here, it is assumed that the print button 909 has stored processing for displaying the window for a print setting screen as a corresponding action. Therefore, the C-graphics controller unit 306 transmits a request to the browser application to display the window for a print setting screen. After receiving the request, the browser application displays the print setting screen (not shown) on the operation unit 106. The above is a description of the specific example of when the print button 909 has been selected on the browser application screen.

Case where Copy Button 601 is Selected on Initial Screen

Figure 10:
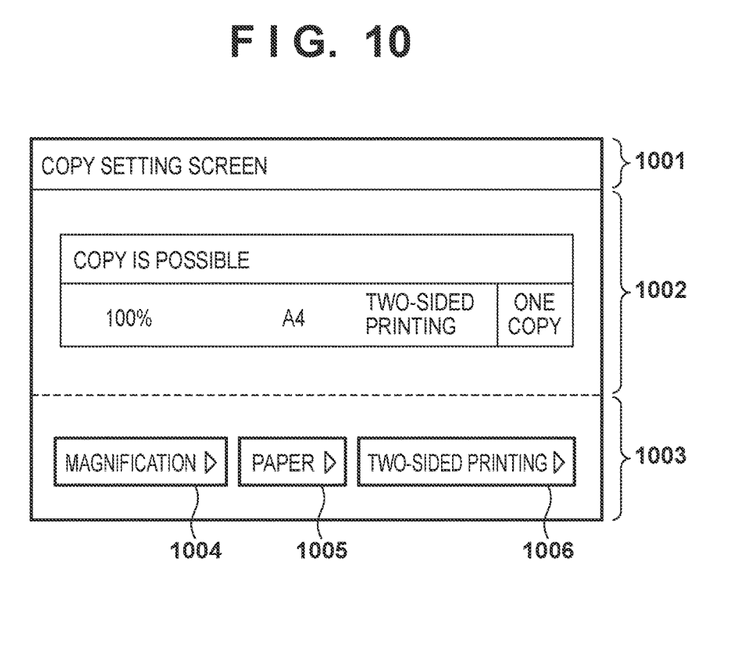
FIG. 10 illustrates an example of a screen that is displayed on the operation unit 106 of the image forming apparatus 100.

The following describes processing that is performed when a user has touched a button on the screen of the copy application, which is a Java application. The user touches the copy button 601 on the initial screen of FIG. 6 with his or her finger, and then releases his or her finger. Accordingly, the copy application screen of FIG. 10 is displayed on the operation unit 106. The detail of this processing is the same as the above-described processing that is performed when the browser button 604 is touched and released except for the copy application screen being displayed, and thus a description thereof is omitted. The following describes the screen of FIG. 10.

Configuration of Copy Setting Screen

The copy application screen of FIG. 10 is constituted by a title display region 1001, a setting check region 1002, and a setting item display region 1003. The title display region 1001 displays the "copy setting screen", and the setting check region 1002 displays the current setting content. This setting check region 1002 displays "copy is possible", which means that copying can be executed, magnification "100%", paper size "A4", two-sided printing setting "two-sided printing", and the number of copies "one". Furthermore, the setting item display region 1003 includes a magnification button 1004 to set the magnification, a paper button 1005 to set the paper, and a two-sided printing button 1006 to set two-sided printing. When a user presses these buttons 1004 to 1006, screens for configuring the respective settings will be displayed.

Operation on Copy Application Screen

It is presumed that a user has touched the position of the coordinates (400, 400) on the screen of FIG. 10. The driver unit 301 detects the operation event that has the event type "touch" and the coordinates (400, 400) (step S701). The driver unit 301 transmits the detected information to the event management unit 302.

After having received this event, the event management unit 302 transmits a request to the window management unit 305 to determine whether or not the window displayed on the operation unit 106 is a window of the C-application. After having received the request, the window management unit 305 determines whether or not the window displayed on the operation unit 106 is a window of the C-application (step S702). Here, since a window of the copy application, which is the Java application, is displayed, the window management unit 305 determines that a window of the C-application is not displayed, and transmits the result to the event management unit 302. After having received the result, the event management unit 302 transmits a transmission information change request and the received operation event to the transmission information changing unit 303 (step S704).

After having received these, the transmission information changing unit 303 performs destination change and coordinate change (step S704). The detail of this processing will be described. It is assumed here that the copy application uses the rendered control management table of FIG. 4C in order to display the screen of FIG. 6. FIG. 4C shows that the magnification button 1004 is displayed on the window with the ID 11000, the paper button 1005 is displayed on the window with the ID 12000, and the two-sided printing button 1006 is displayed on the window with the ID 13000. This rendered control management table has the same format as that of FIG. 4B above, and thus a detailed description thereof is omitted.

After having received the information from the event management unit 302, the transmission information changing unit 303 searches the rendered control management table for a child window including the coordinates (400, 400) of the received operation event. Here, since the coordinates (400, 400) are included in the child window with the ID 13000 (that is, the two-sided printing button), this child window is set as the destination (the window with the ID 13000 is set as the destination). Note that if there is no child window that includes the event coordinates, the base window (window with the ID 10000) is assumed to be set as the destination. Furthermore, the transmission information changing unit 303 converts the coordinates of the received event into coordinates within this child window. Here, since the coordinates of the received event are (400, 400) and the upper left coordinates (that is, the origin) of the child window are (350, 380), the coordinates (50, 20) within the child window are obtained by subtracting the coordinates of the origin from the event coordinates. Also, the transmission information changing unit 303 transmits a new operation event having the coordinates within the child window (the new operation event having the event type "touch" and the coordinates (50, 20)), and the destination information (window with the ID 13000) to the event management unit 302.

After having received this event, the event management unit 302 transmits a transmission event generation request and the new operation event to the transmission event generation unit 304.

After having received these, the transmission event generation unit 304 determines whether or not the received new operation event has the event type "touch" (step S705). Here, since the event type is "touch", the transmission event generation unit 304 generates a dummy enter event (step S706), and transmits this dummy event to the event management unit 302. The dummy event that is generated in step S706 is an event that has the event type "enter" and the coordinates (0, 0).

After having received the dummy event, the event management unit 302 transmits the destination information received from the transmission information changing unit 303 and the dummy event to the window management unit 305 (step S707). The information that is transmitted here is information indicating that the destination is the window with the ID 13000, the event type is "enter", and the coordinates are (0, 0). Furthermore, the event management unit 302 transmits the new operation event and the destination information that were received from the transmission information changing unit 303 to the window management unit 305 (step S708). The information that is transmitted here is information indicating that the destination is the window with the ID 13000, the event type is "touch", and the coordinates are (50, 20). After having received the events, the window management unit 305 transmits the received events to the Java-graphics controller unit 308. The above is a description of the case where the event type of the operation event is "touch".

The following describes a case where the event type of the operation event is "release". It is presumed that the user has released his or her finger from the position of the coordinates (400, 400) on the screen of FIG. 10. The driver unit 301 detects the operation event that has the event type "release" and the coordinates (400, 400) (step S701). The driver unit 301 transmits the detected information to the event management unit 302.

As with the above-described case of the touch event, the event management unit 302 that has received this event determines what the window displayed on the operation unit 106 is (step S702), and changes the transmitted information using the transmission information changing unit 303 (step S704). Then, the event management unit 302 transmits a transmission event generation request and the new operation event to the transmission event generation unit 304. After having received these, the transmission event generation unit 304 determines whether or not the event type of the received new operation event is "touch" (step S705).

Since the event type here is "release", the transmission event generation unit 304 generates a dummy leave event (step S709), and transmits the generated event to the event management unit 302. The dummy event generated in step S709 is an event that has the event type "leave" and the coordinates (0, 0). After the event has been received, the event management unit 302 transmits the new operation event and the destination information that were received from the transmission information changing unit 303 to the window management unit 305 (step S710). The information that is transmitted is information indicating that the destination is the window with the ID 13000, the event type is "release", and the coordinates are (50, 20). Furthermore, the event management unit 302 transmits the dummy event and the destination information to the window management unit 305 (step S711). The information that is transmitted is information indicating that the destination is the window with the ID 13000, the event type is "leave", and the coordinates are (0, 0). The above is a description of the case where the event type of the operation event is "release".

Based on the above-described enter event and touch event as well as the currently received release event and leave event, the Java-graphics controller unit 308 determines that the two-sided printing button 1006 has been selected. Here, it is assumed that the two-sided printing button 1006 has stored processing for displaying the window for a two-sided printing setting screen as a corresponding action. Accordingly, the Java-graphics controller unit 308 transmits a request to the copy application to display the window for a two-sided printing setting screen. After having received this request, the copy application displays the two-sided printing setting screen (not shown) on the operation unit 106. The above is a description of the specific example of when the two-sided printing button 1006 has been selected on the copy application screen. The above is a description of the specific example of when a user has performed an operation on the copy screen.

As described above, it is possible to change the number of events and event information that are to be transmitted according to the window of the application that is displayed on the operation unit 106. Accordingly, also in the image forming apparatus 100 including the graphics controller units 306 and 308 that run in response to different events, it is possible to run an application without changing an existing application.

Modification 1 (Regarding Coordinates of Dummy Event)

In the foregoing embodiment, the coordinates of the dummy events that are generated in steps S706 and S709 of the flowchart of FIG. 7 are set to (0, 0) in order to make it clear that the dummy events are dummies. However, the coordinates may be the same coordinates as those of the operation events having the event types "touch" and "release". Accordingly, received coordinates can be used as is.

Modification 2 (in which Application Processing is Performed in Response to Only "Touch" or "Release")

In the foregoing embodiment, the graphics controller unit determines that the rendered control has been selected in the case of both "touch" and "release" events, but it is also possible to determine that the rendered control has been selected in the case of only a "touch" event. Accordingly, the display of the operation unit 106 can be switched at an early timing, and the operability of the user may be improved.

Modification 3 (Regarding Determination of Event Destination)

In the foregoing embodiment, the determination of step S702 of the flowchart of FIG. 7 is based on whether or not a window of the C-application is displayed on the operation unit 106, but may be based on whether or not the C-application is performing display. That is, the determination of the destination of an event may be based on, instead of a window, an application that is performing display. Accordingly, it is possible to perform high speed processing when one application uses only one window.

Second Embodiment

In the first embodiment, the driver unit 301 detects only a touch event and a release event. However, the driver unit 301 may detect a move event, which is generated by a user moving his or her finger that is touching the operation unit 106 without releasing it. The present embodiment describes a case where a move event is generated, with reference to the flowchart of FIG. 8. Upon input of a move event for example, the Java-application unit 309 and the Java-graphics controller unit 308 determine that a slide operation has been made and execute the processing that corresponds to the slide operation based on the positional relationship to the displayed window. It is assumed here that the Java-graphics controller unit 308 can determine that a slide operation has been performed, based only on the move event. Note that the basic processing or control are the same as those of the first embodiment, and thus only differences from the first embodiment will be described.

It is assumed that a user has performed a touch operation and then performed a move operation using the operation unit 106. At this time, the driver unit 301 detects an event that has the event type "move" (step S701). If a window of the C application is displayed on the operation unit 106, the event management unit 302 transmits the event received as is from the driver unit 301 directly to the window management unit 305, as with the first embodiment. On the other hand, if a window of the Java application is displayed on the operation unit 106, the destination and coordinate conversion processing in step S704 is the same as in the first embodiment, but processing for determining the event type (step S705 of the flowchart of FIG. 7) is different from the first embodiment. The following describes processing in which the event type is "move".

Figure 8:
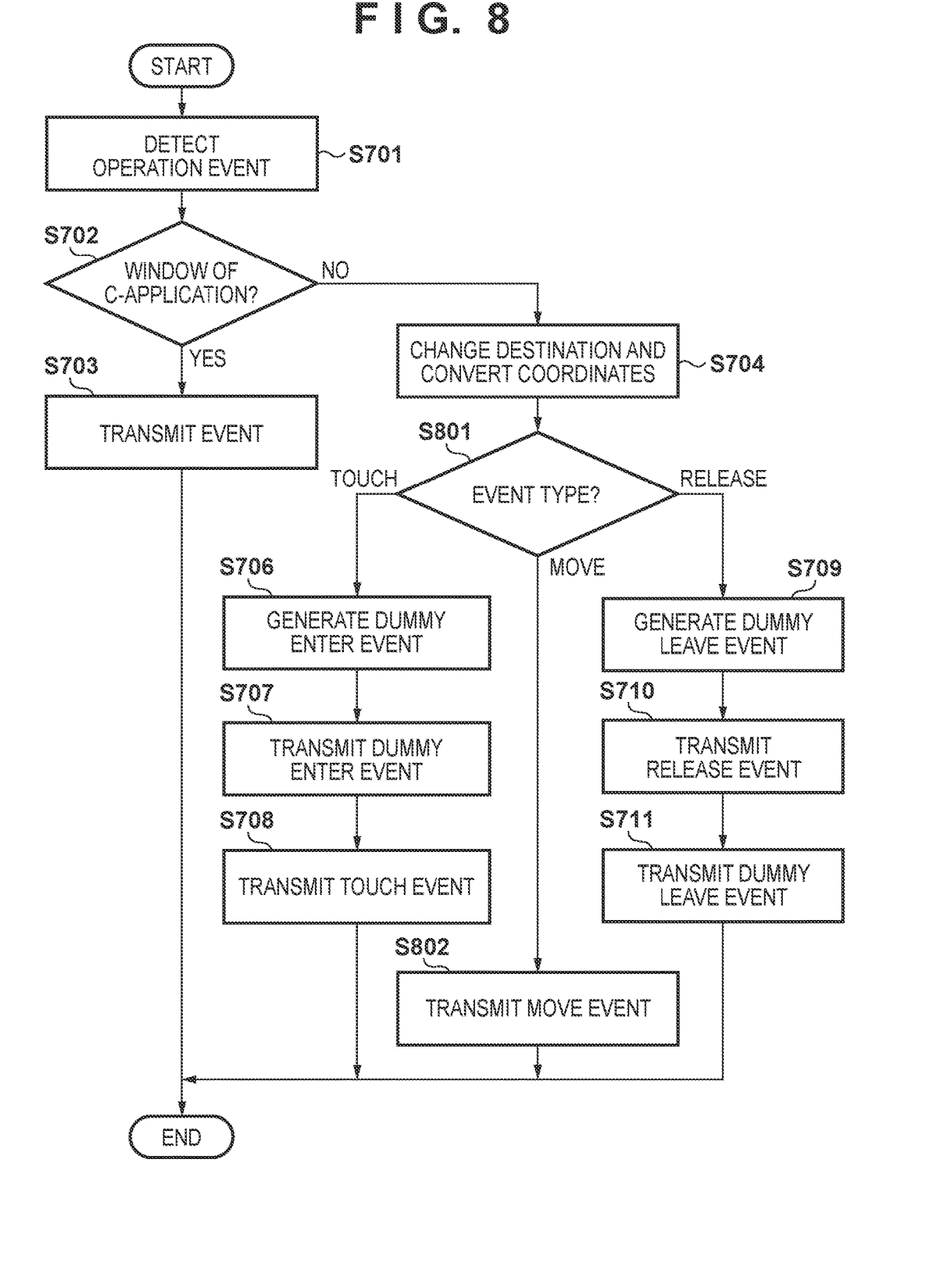
FIG. 8 is a flowchart of processing for controlling an event in accordance with a user operation according to a second embodiment of the present invention.

After having received a transmission event generation request from the event management unit 302, the transmission event generation unit 304 determines what the event type of the received operation event is (step S801). Here, if the event type is "touch" or "release", the same processing as that of the first embodiment will be performed. However, if the event type is "move", the transmission event generation unit 304 will not generate a dummy event but will transmit information indicating that no transmission event is to be generated to the event management unit 302.

After having received the information, the event management unit 302 transmits the new operation event received from the transmission information changing unit 303 to the destination information received from the transmission information changing unit 303 (step S802). In other words, the event management unit 302 transmits the operation event that is addressed to a child window and has the event type "move" and whose coordinates are converted into coordinates in the child window. Accordingly, in contrast to the first embodiment, in the case of a move operation, no dummy event is generated. The above is a description of the processing that is performed when the event type is "move".

As described above, no dummy event is transmitted for an event that does not need a dummy event for a graphics controller. Accordingly, the graphics controller can perform an appropriate operation on a generated event regardless of the type thereof. Furthermore, unnecessary event transmission to the window management unit 305 is reduced, making it possible to suppress the amount of information that is to be processed in the entire system.

The description above has taken an example in which a dummy event is neither generated nor transmitted for a move event, but when an event is an event for which a graphics controller does not need a dummy event, it is sufficient that the event management unit 302 transmits a generated event directly to the graphics controller via the window management unit 303.

Furthermore, in the first and second embodiments, descriptions were given taking a touch event and a release event for use in, for example, a selection operation as examples. However, even with respect to another event, as long as it is an event for which the graphics controller unit needs a dummy event, generation of a dummy event and addition thereof in an appropriate order are performed similar to the first and second embodiments. Furthermore, events for which dummy events are needed are managed in association with the dummy events in a table or the like with respect to each application for displaying a window, and a dummy event is generated and added based on the table, thereby making it possible to achieve more flexible support.

Furthermore, in the foregoing description, an example is taken in which a dummy event is added, but a configuration is also possible in which an event generated by the driver unit 301 is deleted by an event management unit. For example, a configuration is also possible in which when the driver unit 301 has detected a touch, an enter event is first generated, and then a touch event is generated. In this case, with respect to a window of the Java application, the events are directly transmitted, whereas with respect to a window of the C application, the enter event generated prior to the touch event is deleted by the event management unit 302, and then only the touch event is transmitted. The same applies to a release event and a leave event.

Furthermore, in the foregoing embodiments, the operation unit 106 has a configuration in which the transparent touch panel 203 is overlapped with the LCD 206, which is a display unit, but the invention according to the present embodiment is also applicable to a configuration in which the touch panel 203 is separated from the display unit.

OTHER EMBODIMENTS

Embodiment(s) of the present invention can also be realized by a computer of a system or apparatus that reads and executes computer executable instructions (e.g., one or more programs) recorded in a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-145250, filed Jul. 22, 2015 which is hereby incorporated by reference herein in its entirety.

What is claimed is:
1. An information processing apparatus comprising:
an input device including a display;
at least one processor; and
at least one memory storing instructions,
wherein, upon execution of the stored instructions, the at least one processor functions as:
  a driver configured to generate an event according to an operation on an input device;
  a change unit configured to change the event generated by the driver into a set of events, based on a type of the event;
  a first graphics controller unit, configured to input a processing request according to an operation corresponding to a received event to a first application associated with the first graphics controller unit in response to a reception of the event generated by the driver;

a second graphics controller unit, configured to input a processing request according to an operation corresponding to a received event to a second application associated with the second graphics controller unit in response to a reception of the set of events changed by the change unit; and a management unit configured to manage a window displayed on the display by one of the first application and the second application, and to transmit the set of events changed by the change unit to the second graphics controller unit when the operation on the input device is done in a window of the second application, and transmit the event generated by the driver in response to the operation of the input device to the first graphics controller unit when the operation on the input device is done in a window of the first application.

2. The information processing apparatus according to claim 1, wherein, if the event generated in response to the operation of the input device is a touch event or a release event, and the second graphics controller unit to which the event is to be transmitted is of a type that needs an enter event for the touch event and a leave event for the release event, the change unit adds an enter event as the predetermined event when the event generated in response to the operation of the input device is the touch event, and adds a leave event as the predetermined event when the event generated in response to the operation of the input device is the release event.

3. The information processing apparatus according to claim 1, wherein the change unit is configured to convert coordinates of the event generated in response to the operation of the input device, depending on the type of the second graphics controller unit to which the event is to be transmitted.

4. The information processing apparatus according to claim 1, wherein the change unit is configured to determine the graphics controller unit that corresponds to the application currently displaying a window in which the event has been generated, as the second graphics controller unit to which the event is to be transmitted.

5. The information processing apparatus according to claim 1, wherein the first and second graphics controller units respectively correspond to languages describing applications, and are used depending on the application to be executed.

6. The information processing apparatus according to claim 1, wherein, upon execution of the stored instructions, the at least one processor further functions as an application configured to execute processing that corresponds to the processing request from either the first or second graphics controller unit.

7. A non-transitory computer-readable medium storing a program for causing a computer to function as:

a driver configured to generate an event according to an operation on an input device including a display;

a change unit configured to change the event generated by the driver into a set of events, based on a type of the event;

a first graphics controller unit, configured to input a processing request according to an operation corresponding to a received event to a first application associated with the first graphics controller unit in response to a reception of the event generated by the driver;

a second graphics controller unit, configured to input a processing request according to an operation corresponding to a received event to a second application associated with the second graphics controller unit in response to a reception of the set of events changed by the change unit; and a management unit configured to manage a window displayed on the display by one of the first application and the second application, and to transmit the set of events changed by the change unit to the second graphics controller unit when the operation on the input device is done in a window of the second application, and transmit the event generated by the driver in response to the operation of the input device to the first graphics controller unit when the operation on the input device is done in a window of the first application.

8. An event management method which is performed by an information processing apparatus having a driver configured to generate an event according to an operation on an input device including a display, a first graphics controller unit configured to input a processing request according to an operation corresponding to a received event to a first application associated with the first graphics controller unit in response to a reception of the event generated by the driver, and a second graphics controller unit configured to input a processing request according to an operation corresponding to a received event to a second application associated with the second graphics controller unit in response to a reception of a set of events, the method comprising:

changing the event generated by the driver into a set of events for the second graphics controller unit, based on a type of the event;

managing a window displayed on the display by one of the first application and the second application; and transmitting the set of events changed in the changing to the second graphics controller unit when the operation on the input device is done in a window of the second application, and transmitting the event generated by the driver in response to the operation of the input device to the first graphics controller unit when the operation on the input device is done in a window of the first application.

* * * * *